United States Patent
Graaf et al.

(10) Patent No.: US 9,821,625 B2
(45) Date of Patent: Nov. 21, 2017

(54) HEAT EXCHANGER ASSEMBLY FOR HEAT ABSORPTION AND CLIMATE CONTROL SYSTEM OF A MOTOR VEHICLE

(71) Applicant: VISTEON GLOBAL TECHNOLOGIES, INC., Van Buren Township, MI (US)

(72) Inventors: Marc Graaf, Krefeld (DE); Roberto Della Rovere, Kerpen (DE); Navid Durrani, Kerpen (DE)

(73) Assignee: HANON SYSTEMS, Daejeon-si (KR)

( * ) Notice: Subject to any disclaimer, the term of this patent is extended or adjusted under 35 U.S.C. 154(b) by 1039 days.

(21) Appl. No.: 14/032,918

(22) Filed: Sep. 20, 2013

(65) Prior Publication Data

US 2014/0075975 A1    Mar. 20, 2014

(30) Foreign Application Priority Data

Sep. 20, 2012 (DE) .......................... 10 2012 108 889
Jun. 14, 2013 (DE) .......................... 10 2013 106 209

(51) Int. Cl.
*B60H 1/00*      (2006.01)

(52) U.S. Cl.
CPC ........ *B60H 1/00007* (2013.01); *B60H 1/0005* (2013.01); *B60H 1/00057* (2013.01); *B60H 2001/00085* (2013.01); *B60H 2001/00135* (2013.01); *B60H 2001/00178* (2013.01)

(58) Field of Classification Search
CPC .............. B60H 1/00007; B60H 1/0005; B60H 1/00057; B60H 2001/00178; B60H 2001/00085; B60H 2001/00135
See application file for complete search history.

(56) References Cited

U.S. PATENT DOCUMENTS

| | | |
|---|---|---|
| 6,644,055 B2 | 11/2003 | Ohta et al. |
| 6,898,946 B2 | 5/2005 | Ogiso et al. |
| 7,207,180 B2 | 4/2007 | Arndt et al. |
| 7,398,653 B2 | 7/2008 | Oomura et al. |
| 2002/0095943 A1* | 7/2002 | Hatakeyama ...... B60H 1/00007 62/324.1 |

(Continued)

FOREIGN PATENT DOCUMENTS

| | | |
|---|---|---|
| DE | 102011052285 A1 | 1/2013 |
| DE | 102011052752 A1 | 2/2013 |

(Continued)

*Primary Examiner* — Emmanuel Duke
(74) *Attorney, Agent, or Firm* — Shumaker, Loop & Kendrick, LLP; James D. Miller (57) ABSTRACT

A heat exchanger assembly for cooling of air includes a blower, an air duct and a heat exchanger integrated in a coolant circuit designed to allow coolant to flow therethrough and air to be applied to it. Heat from the air is transferred to the vaporizing coolant. The blower is arranged upstream of the heat exchanger in the airflow direction so that waste from the blower heats the air before reaching the heat exchanger. The heat exchanger is designed as tubular heat exchanger with tubes arranged in rows having a double-row design. A method for operating a climate control system for a combined refrigeration system and heat pump operation for cooling and for heating, and a method for identifying and prevention of icing of the evaporator of the climate control system are also disclosed.

5 Claims, 2 Drawing Sheets

(56) References Cited

U.S. PATENT DOCUMENTS

2011/0016896 A1    1/2011  Oomura et al.
2011/0139420 A1*   6/2011  Wang .................... F28F 21/084
                                                            165/172

FOREIGN PATENT DOCUMENTS

| | | |
|---|---:|---|
| FR | 2743027 A1 | 7/1997 |
| JP | H0558138 A | 3/1993 |
| JP | H05178068 A | 7/1993 |
| JP | H0632143 A | 2/1994 |
| JP | H0640242 A | 2/1994 |
| JP | H08238919 A | 9/1996 |
| JP | H10329535 A | 12/1998 |
| JP | 2005207716 A | 8/2005 |
| JP | 2008180503 A | 8/2008 |
| JP | 2011037434 A | 2/2011 |

\* cited by examiner

HEAT EXCHANGER ASSEMBLY FOR HEAT ABSORPTION AND CLIMATE CONTROL SYSTEM OF A MOTOR VEHICLE

CROSS-REFERENCE TO RELATED APPLICATIONS

The present application claims priority to German Provisional Patent Application Serial No. DE 10 2012 108 889.6 filed on Sep. 20, 2012, and to German Non-Provisional Patent Application Serial No. DE 10 2013 106 209.1 filed on Jun. 14, 2013, both of which are hereby incorporated herein by reference in their entirety.

FIELD OF THE INVENTION

The invention relates to a heat exchanger assembly for cooling of air, comprising a blower, an air duct and a heat exchanger. The heat exchanger is integrated into a coolant circuit, through which coolant can flow and to which air can be supplied such that heat from the air can be transferred to the coolant, wherein the coolant evaporates. The invention moreover relates to a climate control system for conditioning the air in the passenger compartment of a motor vehicle, which comprises the heat exchanger assembly. The climate control system has a housing with a first and a second flow path for conducting the air as well as the coolant circuit with a first heat exchanger, which corresponds to the heat exchanger of the heat exchanger assembly, a compressor, the second heat exchanger, and an expansion device. The first heat exchanger is arranged in the first flow duct and the second heat exchanger is arranged in the second flow duct. The invention furthermore relates to a method for operating the climate control system for a combined refrigeration system and heating operation as well as for the reheating operation for air conditioning the passenger compartment by the reheating operation as well as a method for identifying and prevention of icing of a heat exchanger operated as an evaporator.

BACKGROUND OF THE INVENTION

For some time, climate control systems for motor vehicles known from the prior art comprise coolant circuits with different individual components, such as the condenser which is traditionally arranged towards the front of the motor vehicle, the compressor linked to and driven by the vehicle engine, the evaporator arranged in the passenger compartment, as well as hoses and connections. The climate control system conditions the air which is subsequently fed into the passenger compartment. The compressor is normally driven by the engine of the motor vehicle by the input of mechanical energy to the compressor shaft. The electrical power for the radiator fan and the blower is supplied from the 12 V electrical power system of the motor vehicle.

The inlet air for the passenger compartment is sucked-in by means of the blower into the air-conditioning unit and is conducted across the evaporator for cooling and/or dehumidification. When the climate control system is operated in the refrigeration mode, heat is extracted from the vaporous coolant compressed in the compressor at a high pressure level, which is discharged into the ambient air.

When the condenser is installed in the frontal area of the motor vehicle, it stands vertical to the direction of airflow and normally has a large mesh surface, which in smaller motor vehicles has values in the range of 14 dm$^2$ to 18 dm$^2$, in motor vehicles of the compact class values in the range of 20 dm$^2$ to 22 dm$^2$, and in the larger motor vehicles values above 24 dm$^2$.

The mesh surface is to be understood as the surface which essentially stands vertically aligned relative to the direction of flow of the air at the inlet and/or at the outlet of the heat exchanger, which is also described as flow surface. For this purpose, the mesh surface comprises the ribbed area or the area of the heat exchanger which is designed with ribs and corresponds to the flow area on the air-side.

Radiator fans designed as axial flow fans are used for conveying the ambient air through the heat exchanger, which are arranged as suction fans on the air discharge side of a so-called radiator module. While the axial fans convey a large air volume flow although at a low pressure differential, the heat exchangers of the refrigeration module, which are arranged sequentially in one row and are flowed through on the air-side, such as the coolant/air heat exchanger of the engine coolant circuit, the intercooler and the condenser of the coolant circuit are designed as shallow as possible to reduce the flow resistance of the air, however. Being shallow is to be understood as the thickness of the heat exchanger in the direction of airflow and/or the length of the flow on the air-side.

In the prior art, climate control systems for motor vehicles were operated in the heat pump mode using ambient air as a heat source, the heat exchangers are used as evaporators when operated as condensers in the refrigeration mode.

During the operation of the heat exchangers, with which heat is discharged from the coolant into the ambient air in the refrigeration mode and heat is absorbed from the ambient air in the heat pump mode, the ambient air is sucked by means of the radiator fan or a radiator fan package through the heat exchanger. Without any additional air velocity based on the motor vehicle velocity, that is when the motor vehicle is not in motion, only small average airflow velocities of up to 3.5 m/s are attained during maximum radiator fan output.

However, the airflow velocity has a significant influence on the power that can be absorbed from the ambient air without icing of the heat exchanger and therefore on the heating capacity of a heat pump, using ambient air as a heat source. Because of the arrangement of the radiator fan in the airflow direction downstream of the heat exchanger known from the prior art, the waste heat being generated in the drive of the radiator fan is moreover not usable.

An air volume less than 600 kg/hr. is traditionally applied on the heat exchanger when operated as evaporator in the refrigeration mode. On the other hand, a significantly higher air volume of more than 1800 kg/hr. flows through the heat exchanger when operated as condenser in the refrigeration mode and as evaporator in the heat pump mode.

Climate control systems with heat pump functionality are also known from the prior art, in which the evaporator is operated as evaporator both in the refrigeration mode as well as in the heat pump mode and the condenser is likewise operated as condenser both in the refrigeration mode as well as in the heat pump mode. In this context, the control of the heat flows is completely realized by controlling the flow on the air-side.

FR 2 743 027 A1 discloses a motor vehicle climate control system with a traditional coolant circuit, comprising merely an evaporator, a compressor, a condenser, and an expansion device. The heat exchangers are arranged in separate flow ducts, which are designed so that they are at least separate from one another in terms of flow technology. The flow ducts have interconnections or bypasses. The air mass flows sucked-in by means of blowers are conducted through the bypasses as required and depending on the operating mode, and are conducted across the surfaces of the heat exchangers by closing and opening of dampers. For this purpose, the air mass flows are cooled and/or dehumidified and/or heated and are subsequently discharged into the passenger compartment and/or into the environment.

DE 10 2011 052 752 A1 describes a modular motor vehicle climate control system for heating and cooling of air. The motor vehicle climate control system comprises a housing with a blower and dampers for the adjustment of airflow paths as well as a coolant circuit with a condenser, an evaporator, a compressor, and expansion device and associated connection lines. An evaporator/airflow path with an integrated evaporator and a condenser/airflow path with an integrated condenser are formed in the housing. Fresh air from the environment, recirculated air from the passenger compartment, or a mixture of both can be supplied to each airflow path. Both airflow paths are interconnected by means of controllable dampers such that the heating or cooling of the passenger compartment is done simply by adjusting the flow path of the air.

Control strategies for preventing icing of the evaporator during operation in the heat pump mode are furthermore known from the prior art. In this context, the power consumption in the evaporator is limited depending on the ambient temperature, such as by means of the temperature level and/or by means of the vapor pressure of the coolant.

DE 10 2011 051 285 A1 discloses a method and a device to control the prevention of icing for an evaporator of a heat pump of climate control systems in motor vehicles. The passenger compartment is heated using a heat pump comprising the evaporator, which uses ambient air as a heat source for evaporating liquid coolant. The thermal velocity of the ambient air is controlled based upon the temperature of the ambient air upstream of the evaporator, utilizing the device to control the prevention of icing. For control, the surface temperature of the evaporator is estimated or calculated by means of measuring signals for pressure and temperature of the coolant flowing in the coolant line in a section of the coolant line between the outlet of the evaporator and the inlet of the compressor, the dewpoint of the ambient air ahead of the motor vehicle is determined, the flow velocity of the ambient air and the temperature level of the evaporator surface is adjusted by means of the aperture cross-section of the expansion device, the coolant mass flow in the coolant line and the rotational speed of the fan is adjusted depending on the number of strokes or the rotational speed of the compressor, depending on the type of compressor. In addition, minimal superheating is specified on the evaporator to prevent localized icing of the evaporator.

SUMMARY OF THE INVENTION

In concordance and agreement with the present invention, a heat exchanger assembly for the cooling of air, wherein heat is to be extracted efficiently from the air by means of a coolant flowing through the heat exchanger and the waste heat of an air conveyance device can be utilized as heat source has surprisingly been discovered.

The purpose of the present invention is to further develop a heat exchanger assembly for the cooling of air, wherein heat is to be extracted efficiently from the air by means of a coolant flowing through the heat exchanger and the waste heat of an air conveyance device can be utilized as heat source.

A further object of the present invention consists in providing a climate control system with heating functionality, in particular for use in motor vehicles. The coolant circuit of the climate control system should be designed with merely a minimum number of components, to be cost-effective as well as low-maintenance. The climate control system should moreover be designed for the combined refrigeration system and heat pump operation and the reheating operation for heating, cooling and dehumidification of the passenger compartment air to be conditioned. In this context, the operation should also be possible in environments with low capacity heat sources, such as with energy-efficient combustion engines or hybrid drives consisting of a combustion engine and an electric motor, and or in the event that heat sources are not available from the drive, such as with electrically powered motor vehicles, and at the same time meet all requirements for providing a comfortable climate in the passenger compartment.

The objective of the invention furthermore is to provide a method for operating the climate control system for efficient operation, particularly in the reheating operation.

A further objective of the present invention is to identify and/or prevent the onset of icing of an evaporator operated as a heat exchanger during heat pump mode operation, in order to maintain the heat pump functionality of the climate control system continuously. At the same time, the method must be easy to implement and be cost-effective.

The invention teaches that this objective is solved by a heat exchanger assembly for cooling of air, comprising a blower, an air duct and a heat exchanger that is arranged integrated in a coolant circuit. The heat exchanger is designed so that coolant can flow through it on the one side and that air can be applied on the other side, such that heat from the air can be transferred to the coolant. The coolant is evaporated during the absorption of heat.

Air ducting is to be understood as a flow duct of a climate control system, for example, in which the air is ducted from the inlet to the outlet and is conditioned.

According to the idea of the invention, the blower of the heat exchanger assembly in the direction of airflow is arranged upstream of the heat exchanger such that the waste heat of the blower heats the air before it reaches the heat exchanger. According to the invention, the heat exchanger is designed as a tubular heat exchanger with tubes arranged in rows, wherein the tubular heat exchanger is designed to be at least double-row.

By transferring the waste heat of the blower into the air to be supplied to the heat exchanger, the air mass flow is advantageously heated by approximately 1K to 5K.

According to a development of the invention, the heat exchanger comprises a flow surface in the region of 2 $dm^2$ to 10 $dm^2$, however preferably in the range of 4 $dm^2$ to 5 $dm^2$. With this flow surface, the heat exchanger can be used as an evaporator both in the refrigeration system operation as well as in the heat pump operation of a motor vehicle climate control system to transfer the power required in each case and at the same time has a smaller flow surface than the heat exchangers known from the prior art, which are operated as condensers in the refrigeration system mode and as evaporators in the heat pump mode. According to a first alternative embodiment, all rows of tubes of the heat exchanger are flowed through as a single flow in each case. In this context, the rows of tubes are advantageously aligned perpendicular to the airflow direction. The coolant flows in one direction parallel through all tubes of a row of tubes, before it is subsequently directed through the tubes of the following row of tubes. In this manner, the tubes in the different rows of tubes on the side of the coolant are flowed through sequentially, i.e. in series.

According to a second alternative embodiment, the heat exchanger is designed such that at least one row of the plurality of tube rows is flowed through in a multi-flow manner. For this purpose, the coolant is directed through a few tubes of a tube row in a first direction, while it flows through other tubes of the same tube row in a second direction that is arranged opposite to the first direction. In each case, the coolant flows parallel through the tubes of the tube row.

The coolant flow from one row of tubes to the following row of tubes can occur either in the direction of or against the direction of flow on the air-side in each case, so that the heat exchanger is designed either as cross-parallel flow heat exchanger or as cross-countercurrent flow heat exchanger.

The heat exchanger is advantageously formed from flat tubes, which are aligned perpendicular to the airflow direction and with their flat side aligned in the direction of airflow. The flat tubes have a width larger than 8 mm. In this context, a flat tube width from 11.5 mm to 18 mm is preferred. It is advantageous, if the flat tubes are designed with a width of 12.3 mm or of 16 mm. In this context, the width of the flat tubes is understood to be the extension of the tubes in the airflow direction.

The heat exchanger is preferably designed with ribs on the air-side. For this purpose, the ribs are arranged advantageously with a consistency of less than 100 ribs/dm, preferably with a consistency of 70 to 80 ribs/dm.

The objective of providing a system with heating functionality is solved by a climate control system for air-conditioning a passenger compartment of a motor vehicle with a heat exchanger assembly as described previously. In this context, the climate control system has a housing with a first and a second flow duct for conducting the air, as well as the coolant circuit with a first heat exchanger designed as an evaporator, a compressor, a second heat exchanger designed as condenser, and an expansion device. The first heat exchanger is arranged in the first flow duct and the second heat exchanger is arranged in the second flow duct. In this context, the first heat exchanger corresponds to the heat exchanger of the heat exchanger assembly according to the invention.

According to the idea of the invention, the climate control system is designed for a combined refrigeration system and heat pump operation for cooling and for heating of the passenger compartment as well as for a reheating operation. The respective operating mode adjustment is done merely by controlling air baffle devices arranged within the climate control system housing and not by means of the control of the coolant circuit. According to the invention, the first heat exchanger is designed and can be operated for cooling and/or dehumidification of an air mass flow independent of the operating mode as evaporator such that the output levels required by the operating mode in each case can be transferred from the air mass flow conducted across the heat transfer surface to the coolant.

The first heat exchanger designed as an evaporator is flowed through both when operated in the refrigeration system mode as well as in the heat pump mode on the coolant side and on the air-side each time in the same direction.

The second heat exchanger is designed preferably as condenser or gas cooler irrespective of the operating mode and is operated for heating an air mass flow.

The heat exchanger assembly can advantageously be used to do the following:

in the heat pump mode:
  convey an air mass flow to the evaporator at an air velocity exceeding 3.5 m/s, preferably approximately 5 m/s;
  convey an air mass flow exceeding 600 kg/hr., preferably approximately 1000 kg/hr., to the evaporator, which is cooled only slightly, for example, when the air enters into the evaporator at a temperature of less than +10° C., preferably less than 0° C., and with a power of more than 1 kW by less than 10 K, preferably less than 5K;
  an output level in the range of 0.3 kW to 6 kW is transferred, wherein an output level in the range of 0.5 kW to 6 kW, preferably in the range of 2 kW to 3 kW, can be transferred at an ambient temperature of −10° C., for example, and
in the cooling system mode:
  an air mass flow smaller than 600 kg/hr., preferably approximately 400 kg/hr., is conveyed to the evaporator, wherein an output level of more than 2 kW can be transferred, and
  an output level exceeding 0.5 kW is transferred, wherein an output level in the range of 4 kW to 8 kW, preferably approximately 6 kW, can be transferred at ambient temperatures above +30° C., for example.

The climate control system with heat pump functionality, i.e. the cooling and/or dehumidification of a first air mass flow and the simultaneous heating of a second air mass flow, can advantageously be operated as a reheating operation. In this context, the reheating operation is possible as a pure reheating operation, i.e. without admixture of unconditioned air.

The processes of cooling and/or of dehumidification of air as well as the heating or reheating of the air is only controlled air-side. The coolant circuit is operated independently of the different operating modes and is not switched over between the operating modes. In this context, the control of the heat flows is completely realized by controlling the flow on the air-side. It is not necessary to switch to the operation of a heat exchanger as a condenser on the one hand, and as an evaporator, on the other. For example, merely the aperture cross-section of the expansion device and/or the rotational speed of the compressor are controlled, depending upon the external conditions such as the ambient temperature or the air mass flow.

The method according to the invention for operating the climate control system for a combined refrigeration system and heat pump operation for cooling and for heating as well as for a reheating operation for conditioning the air of a passenger compartment of a motor vehicle in the reheating operation comprises the following steps:
  conveyance of a first partial air mass flow and a second partial air mass flow in the climate control system,
  cooling of the first partial air mass flow when flowing across an evaporator, and
  splitting up the cooled first partial air mass flow into a partial air mass flow which is discharged into the environment and into a partial air mass flow for reheating as well as a cold air mass flow,
  heating of the second partial air mass flow and the partial air mass flow for reheating when flowing across the heat transfer surface of a condenser,
  mixing of the reheated partial air mass flow with the pre-conditioned cold air mass flow, wherein—the utilized cooling capacity is controlled by means of the temperature of the first partial air mass flow downstream of the evaporator and the pressure level of the coolant in the evaporator, the temperature of the mixed air mass flow is recorded by at least one temperature sensor arranged in the air mass flow by means of the ratio of the partial air mass flow for reheating and the pre-conditioned cold air mass flow by positioning of air baffle devices, and introducing the mixed air mass flow into the passenger compartment.

Temperature sensors are preferably arranged both within the cooled first partial air mass flow as well as within the mixed air mass flow for the determination of the temperatures.

The cooling capacity is controlled by means of an air baffle device for conducting the first partial air mass flow across the evaporator and therefore the pressure level of the coolant in the evaporator.

According to a first alternative, the first and the second partial air mass flows are introduced as a common air mass flow into the climate control system and are split up within the climate control system.

According to a second alternative, the first and the second air mass flow are introduced into the climate control system as separate partial air mass flows. In this context, the partial air mass flows can have different temperatures and/or absolute air humidities.

Splitting up the cooled first partial air mass flow into the partial air mass flow to be discharged into the environment, into the partial air mass flow for reheating as well as into the cold air mass flow, is performed as required for the air mass flow to be conveyed into the passenger compartment regarding air volume, temperature and air humidity.

According to a development of the invention, the ratio of the partial air mass flow for reheating and the pre-conditioned cold air mass flow is controlled between 0% and 100%. The percentage of the first partial air mass flow that is not discharged into the environment can be split up into percentages from 0% to 100%. With split-ups from 0% and/or 100%, the entire partial air mass flow is forwarded as a partial air mass flow for reheating, or as a cold air mass flow. With a split-up deviating between 0% or 100%, a percentage is conducted both as a partial air mass flow for reheating as well as a cold air mass flow.

It is advantageous that the first and the second partial air mass flow are either not or only negligibly mixed when flowing across the heat transfer surfaces of the condenser.

The heating capacity for reheating is preferably controlled by the positioning of air baffle devices, by means of splitting up the heat transfer surface of the condenser into a first and a second area and into the second air mass flow conducted through the second area of the condenser, as well as by the ratio of the partial air mass flow for reheating and the preconditioned cold air mass flow.

Consequently, the heating capacity is also controlled by means of the coolant pressure level in the condenser.

The method as taught by the invention for identifying and prevention of icing of an evaporator of a climate control system comprises the following steps:

measuring the current consumption of a blower associated with the evaporator, determination of the electrical power consumption of the blower for conveyance of the air through the evaporator, comparing the electrical power consumption of the blower with a specified value, wherein the specified value is determined as comparison value from a characteristic curve of the blower, and initiating measures for prevention of icing or initiating active deicing when the value drops below a specified value.

The electrical power consumption of the blower depends primarily on the conveyed air volume and only secondarily on the flow resistance on the air-side of the heat exchanger assembly. Because of the increasing flow resistance as the heat transfer surface begins to ice up, the same air volume can no longer be conveyed with an unmodified blower. As a result, the air volume and therefore the electrical power consumption drop. The characteristic curve of the blower is plotted as the attainable air volume depending on the flow resistance. By measuring the power consumption of the blower assigned to the evaporator it can therefore be detected when icing begins, and measures for prevention of icing or active deicing can be initiated.

The solution according to the invention has miscellaneous advantages which can be summed up as follows:

an efficient climate control system for simultaneous dehumidification and heating, rapid supply of warm air at low ambient temperatures and cold engine cooling water for motor vehicles with a combustion engine, minimal complexity in the coolant circuit, which essentially means doing without changeover valves and minimizing the number of expansion valves, heat exchangers and coolant lines, as well as reducing the required power for heating up the passenger compartment by recirculation operation and/or by selective ducting of air within the flow ducts.

DESCRIPTION OF THE DRAWINGS

Further particulars, features and advantages of the invention result from the subsequent description of embodiments by referring to the associated drawings, in which: shown is a climate control system with a centrally positioned condenser and four dampers, as follows.

DESCRIPTION OF THE PREFERRED EMBODIMENTS

The following detailed description and appended drawing describe and illustrate an exemplary embodiment of the invention. The description and drawing serve to enable one skilled in the art to make and use the invention, and are not intended to limit the scope of the invention in any manner. In respect of the method disclosed, the order of the steps presented is exemplary in nature, and thus, is not necessary or critical.

Figure 1:
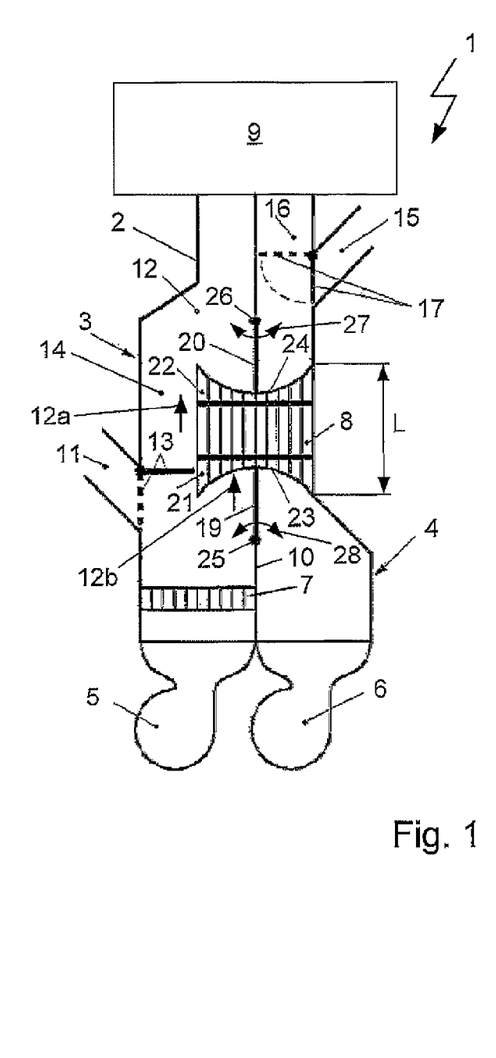
FIG. 1 is a climate control system with a centrally positioned condenser and four dampers with two blowers.

FIG. 1 illustrates a climate control system 1 with a centrally arranged heat exchanger 8 designed as condenser as well as a housing 2, comprising a first flow duct 3 as well as a second flow duct 4, wherein to each flow duct 3, 4 a blower 5, 6 has been assigned to which fresh air from the environment, recirculated air from the passenger compartment 9, or a mixture of both can be supplied.

In that context, the central arrangement is to be understood as the alignment of the heat exchanger 8 relative to a partition 10, which subdivides the heat exchanger 8 into two equally sized areas. The second area is arranged with in the second flow duct 4 and covers the entire flow area of the flow duct 4. The first area of the heat exchanger 8 is arranged within the first flow duct 3 and covers merely a partial cross-section of the flow duct 3.

Whilst in the second flow duct 4 only the condenser 8 is arranged, a heat exchanger 7 designed as an evaporator is arranged in addition in the first flow duct 3, wherein both are designed as components of a coolant circuit of the climate control system 1 and as air-supplied heat exchangers 7, 8. In this context, the evaporator 7 occupies the entire flow area of the flow duct 3. The condenser 8 is arranged overlapping the flow ducts and comprises two areas. The second area is arranged within the second flow duct 4, covering the entire flow area, and extends into the first flow duct 3, so that the first area of the condenser 8 is arranged within the first flow duct 3. The first and the second flow duct 3, 4 are separated from each other by the partition 10 as well as by two additional air baffle devices 19, 20 designed as movable dampers, and by static air baffle devices 21, 22 designed as a baffle plates. The air mass flow conducted through the condenser 8 is determined according to the rotational speed of the blower 6 and the positioning of the air baffle devices 19, 20.

The flow duct overlapping arrangement of the condenser 8 brings about that the heat transfer surface can be adjusted and partitioned into two areas. For this purpose, the condenser 8 can be subdivided into areas from 0% to 100% of the entire heat transfer surface. In case of subdivisions from 0% and/or 100%, the condenser 8 is arranged completely in one of the flow ducts 3, 4. With a heat exchanger array where the heat transfer surface split-up varies from 0% or 100%, the areas are proportionally arranged within the flow duct 3 and within the flow duct 4, for example with a heat exchanger arrangement where the heat transfer surface is split up 30%, 30% of the surface is arranged within the flow duct 3 and 70% within the flow duct 4.

According to an alternative embodiment (not shown), the flow duct overlapping arrangement of the condenser 8 results in a non-adjustable split-up of the heat transfer surface also into two areas. For this purpose, the condenser 8 is again subdivided into areas from 0% to 100%, but preferably from 0% to 30% of the entire heat transfer surface.

The separately controllable blowers 5, 6 produce advantageous dynamics of the climate control system 1 since the first flow duct 3 with the evaporator 7 and the second flow duct 4 with the condenser 8 can be supplied with air mass flows at different velocities, which in turn facilitates a quick response to changed operating conditions.

The blower 5 of the first flow duct 3 conducts the sucked-in air as an air mass flow to the evaporator 7. When flowing across the heat transfer surfaces of the evaporator 7, the air mass flow is cooled and/or dehumidified.

The cooled and/or dehumidified partial air mass flow discharging from the evaporator 7 into the environment by means of the cold airflow path 11 and into the passenger compartment 9 by means of the cold airflow path 12 can be split up into a required ratio or can be assigned completely to one of the cold airflow paths 11, 12. The partial air mass flow is split up by the air baffle device 13 designed as a damper.

The partial air mass flow 12 through the cold air flow path can be split up in turn into a cold mass airflow and a partial mass airflow for reheating. The cold air mass flow conducted through the cold airflow path 12 is conducted through the bypass duct 14 around the condenser 8. The partial air mass flow for reheating is guided across the first part of the condenser 8 and heated to the temperature preselected by the climate control.

The blower 6 sucks-in air same as blower 5 and directs the sucked-in air as air mass flow to condenser 8. The air mass flow is heated as it flows across the heat transfer surfaces of the evaporator 8.

The warm air mass flow exiting from the evaporator 8 can be split up into a partial air mass flow across the warm airflow path 15 into the environment and into a partial air mass flow across the warm airflow path 16 into the passenger compartment 9 in a required ratio, or be assigned completely to one of the warm airflow paths 15, 16. The warm air mass flow is split up by means of the air baffle device 17 designed as a damper.

The air baffle devices 13, 17 can alternatively each be designed as two separate dampers, wherein two dampers are arranged inside the cold airflow paths 11, 12, and two dampers are arranged inside the warm airflow paths 15, 16, in each case. For this purpose, each of the two dampers can be coupled by a kinematic device and be adjustable by means of a single drive in each case.

The air baffle devices 19, 20 comprising respectively matched shapes and the air baffle plates 21, 22 establish an air baffle fixture for the heat exchanger and serve to prevent mixing of the air mass flow, which was cooled and conditioned while flowing through the evaporator 7, with the unconditioned air mass flow of the second flow duct 4 inside the first flow duct 3.

The air baffle devices 21, 22 designed as air baffle plates are arranged aligned parallel to partition 10, so that the air mass flows flowing along the partition 10 are not diverted in the direction of flow when flowing against the air baffle plates 21, 22 as they are flowing past or through them.

The air baffle plates 21, 22 which are each arranged on both sides extending into the flow ducts 3, 4, and are therefore further away from the partition 10, comprise an increasing length L. The further away the air baffle plates 21, 22 are arranged from the partition 10, the greater the length L of the air baffle plates 21, 22, wherein the lengths L of the adjacently arranged air baffle plates 21, 22 are increasing to such an extent that the ends of the entire array of the air baffle plates 21, 22 are forming two concave surfaces 23, 24. Each of the surfaces 23, 24 are shaped rectangular and are each aligned parallel about an axis 25, 26 to the surfaces 23, 24, are uniformly curved, so that the first two opposite lateral edges of a rectangular surface 23, 24 form a straight in each case, while the second two opposite lateral edges represent an arc.

Each of the center points of the arcs represent the axis 25, 26 about which the rectangular surface 23, 24 is curved. The axes 25, 26 in this context correspond to the axes of rotation of the movable air baffle devices 19, 20. The radii of the circular-arc curved surfaces 23, 24 correspond to the longitudinal extension of the air baffle devices 19, 20, i.e. the extension of the movable air baffle devices 19, 20, in the flow direction of the air mass flows through the flow ducts 3, 4.

The pivotable air baffle devices 19, 20 are aligned with the lateral edge facing away from the axis of rotation 25, 26 towards the concave curved surface 23, 24 mounted from the ends of the air baffle plates 21, 22. To ensure the unrestricted movement of the air baffle devices 19, 20, a gap of minimal width remains between the surface 23, 24 and the lateral edge of the air baffle device 19, 20, which does not or only negligibly affects the flow of the air mass flow.

The percentage of the areas of the condenser 8 in the first flow duct 3 and the second flow duct 4 can be adjusted by simultaneous rotation of the air baffle devices 19, 20 about the respective axis of rotation 25, 26 in the opposite direction of rotation 27, 28. The split-up of the areas of the condenser 8 can essentially occur steplessly. Potential stages during the rotation of the air baffle devices 19, 20 result from the distances of the air baffle plates 21, 22 perpendicular to the direction of flow of the air mass flows through the flow ducts 3, 4. The air baffle devices 19, 20 are aligned following the rotation such that the lateral edges parallel to the axis of rotation 25, 26 and facing away from the axis of rotation 25, 26 stands opposite an end of an air baffle plate 21, 22, so that the air mass flow can flow along a continuous flow surface. The leakage flows occurring during the interim positions of the air baffle devices 19, 20 with respect to the air baffle plates 21, 22, are negligible. An interim position is to be understood as the position of the air baffle devices 19, 20, when the lateral edges of the air baffle devices 19, 20 are not exactly opposite an edge of an air baffle plate 21, 22, but is positioned between two air baffle plates 21, 22.

When the air baffle devices 19, 20 are rotated in the directions of rotation 27, 28 up to the maximum longitudinal extension of the air baffle plates 21, 22, that is until reaching the outer housing wall of the second flow duct 4, the entire condenser 8 is positioned within the first flow duct 3. The air baffle devices 19, 20 are in the first end position. When the air baffle devices 19, 20 are rotated opposite to the direction of rotation 27, 28 up to the maximum longitudinal extension of the air baffle plates 21, 22, that is in the direction of the outer housing wall of the first flow duct 3 and/or in the direction of the bypass duct 14, the entire condenser 8 is positioned within the second flow duct 4. The air baffle devices 19, 20 are in the second end position. In addition to the two end positions, the air baffle devices 19, 20 can be adjusted into interim positions. The center interim position is illustrated in FIG. 1.

During operation in the refrigeration system mode or heat pump mode, the air baffle devices 19, 20 are positioned in the second end position. The condenser 8 is arranged with the heat transfer surface completely within the second flow duct 4.

During operation in the refrigeration system mode, the air baffle device 13 opens the bypass duct 14 and closes the cold airflow path 11 into the environment, so that the air mass flow sucked-in by the blower 5, conveyed through the first flow duct 3 to the evaporator 7 and cooled and dehumidified when flowing across the evaporator 7, is conducted through the bypass duct 14 and the cold airflow path 12 into the passenger compartment 9. Otherwise, the heated air mass flow when flowing across the condenser 8, conveyed by the blower 6 in the second flow duct 4 to the condenser 8, is transferred into the environment through the warm airflow path 15 which is opened by the air baffle device 17. The warm airflow path 16 is closed. The air baffle devices 19, 20 are aligned such that the condenser 8 is positioned completely in the second flow duct 4.

During operation in the heat pump mode, that is during the heating of the air to be supplied into the passenger compartment 9, the air baffle device 13 opens the cold airflow path 11 and closes the bypass duct 14, so that the air mass flow cooled by flowing across the evaporator 7 sucked-in by the blower 5 and conveyed through the first flow duct 3 to the evaporator 7 is transferred into the environment through the cold airflow path 11. Otherwise, the air mass flow, which is sucked-in by the blower 6 and conveyed to the condenser 8 by the second flow duct 4, being heated while flowing across the condenser 8 by the warm airflow path 16, which is now opened by the air baffle device 17, is conveyed into the passenger compartment 9, whereas the warm airflow path 15 is closed.

The air baffle devices 19, 20 are aligned such that the condenser 8 is positioned completely in the second flow duct 4.

For this purpose, the blowers 5, 6 are each positioned upstream of the evaporator 7 and the condenser 8 in the direction of flow of the air mass flows through the flow ducts 3, 4. By transferring the waste heat of the blowers 5, 6 into the air, each of the air mass flows are heated by approximately 1K to 5K and are conducted in the heated condition to the evaporator 7 as well as to the condenser 8. The respective waste heat of blower 5, 6, can be utilized for heating the air to be supplied into the passenger compartment.

During operation in the reheating mode, the air baffle devices 13, 17 are between 'completely opened' to 'completely closed' in the various positions, as required, and the air baffle devices 19, 20 are positioned in-between their end positions. The pre-conditioned air mass flow to be heated is varied by positioning of the air baffle device 13 as well as the rotational speed of the blower 5.

The heat exchanger designed as evaporator 7 is used irrespective of the operating mode, that is both during operation in the refrigeration system mode as well as during operation in the heat pump mode, on the one hand always for heat absorption by the coolant, while the air mass flow is cooled and/or dehumidified, on the other.

The heat exchanger designed as condenser 8 is likewise always used for the heat transfer from the coolant to the air mass flow, irrespective of the operating mode.

The embodiment according to FIG. 2a-FIG. 2e compared to the climate control system 1 according to FIG. 1 merely comprises a blower 29, which conveys both the air mass flow through the first flow duct 3 as well as also the air mass flow through the second flow duct 4. This climate control system 1 essentially comprises three air baffle elements, designed as air baffle devices 13, 19, 20, which are adequate for control. For this purpose, the air baffle device 20 assumes the function of the air baffle device 17 from FIG. 1, that is the closing and opening of the warm airflow paths 15, 16. The fourth air baffle device 18 designed as damper serves for closing and opening the bypass duct 14. The air baffle device 18 can moreover be used to adjust the ratio of the air mass flows across the evaporator 7 and/or the condenser 8.

Figure 2A:
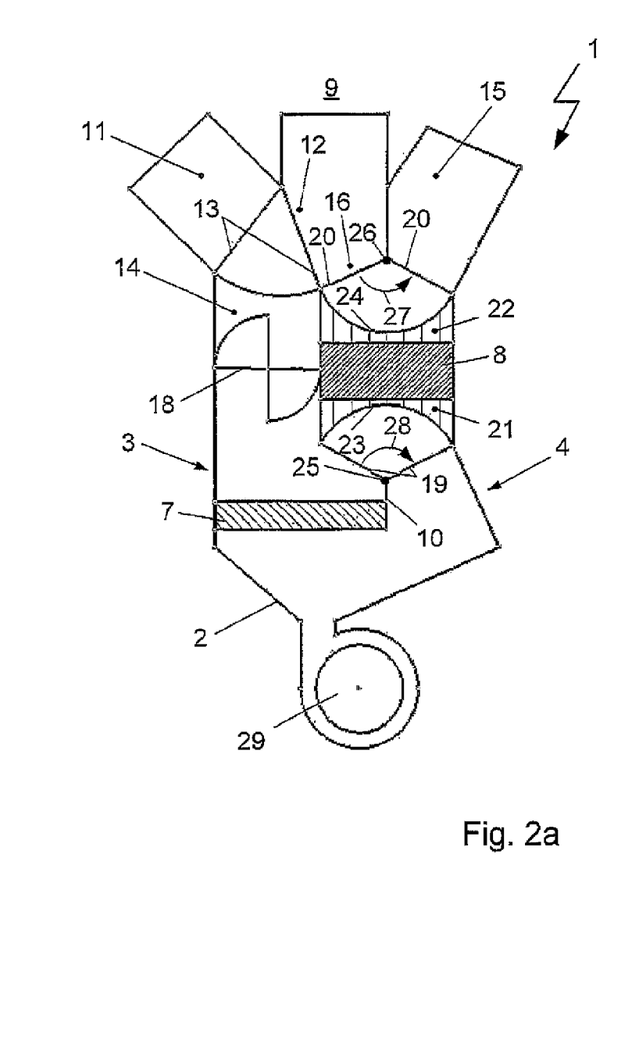
FIG. 2a is a climate control system with a centrally positioned condenser and four dampers with one blower.
Figure 2B:
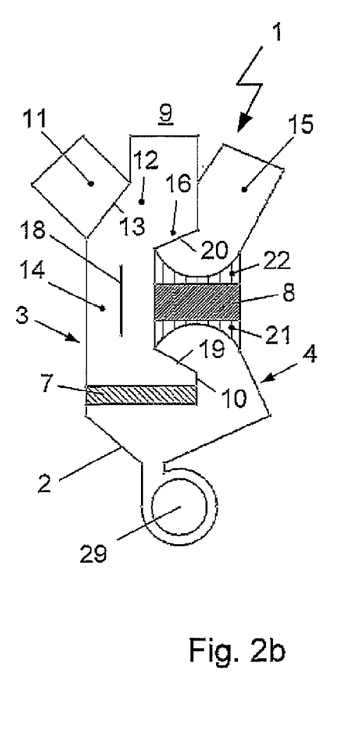
FIG. 2b is a climate control system according to FIG. 2a in the cold system mode.

When operating in the refrigeration system mode according to FIG. 2b, the air baffle devices 19, 20 are positioned in the second end position, so that the condenser 8 is arranged completely within the second flow duct 4. The air baffle device 13 opens the cold airflow path 12 and closes the cold airflow path 11 into the environment. The air mass flow which was cooled and dehumidified while flowing across the evaporator 7 is conducted through the cold air flow path 12 into the passenger compartment 9. The air mass flow which was heated while flowing across the condenser 8 is discharged into the environment through the warm air flow path 15, which is opened by the air baffle device 20. The warm airflow path 16 is closed.

Figure 2C:
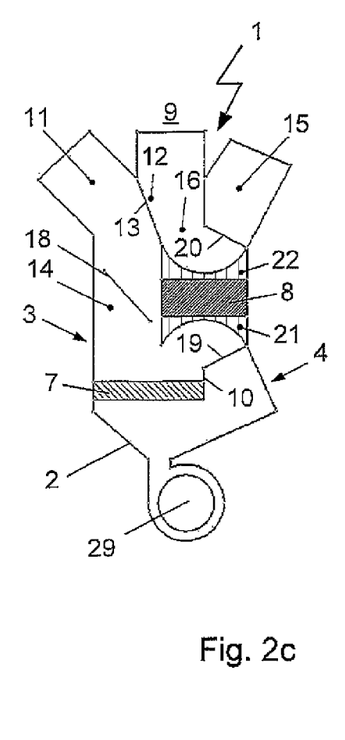
FIG. 2c is a climate control system according to FIG. 2a in the reheating mode with dehumidification.
Figure 2D:
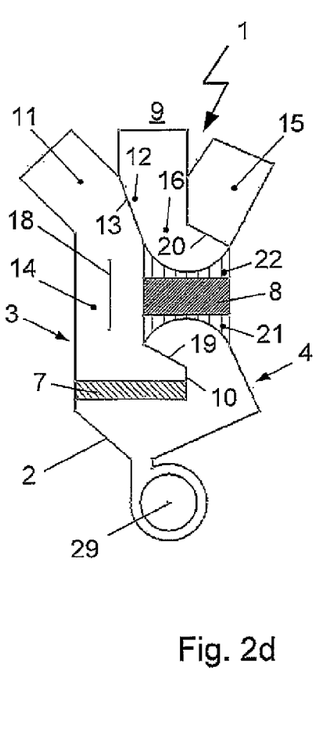
FIG. 2d is a climate control system according to FIG. 2a in the heat pump mode.

When operated with unconditioned air in the heat pump mode according to FIG. 2d, the air baffle device 13 opens the cold air flow path 11 and closes the cold air flow path 12 to the passenger compartment 9, so that the air mass flow which was cooled while flowing across the evaporator 7 is transferred into the environment through the cold airflow path 11. Otherwise, the air mass flow heated while flowing across the condenser 8 will be conveyed into the passenger compartment through the warm air flow path 16 which is now being opened by the air baffle device 20, while the warm air flow path 15 is closed.

The air baffle devices 19, 20 are arranged so that they are opposite each other. The air baffle device 19 is in the first end position, while the air baffle device 20 is arranged in the second end position and at the same time closes the warm air flow path 15 and opens the warm air flow path 16.

A pure heat pump operation mode or heating operation with unconditioned air is selected when dehumidification of the air to be supplied into the passenger compartment 9 is not required, or is not desirable. Viewed in the direction of flow of the sucked-in air, the blower 29 is positioned upstream of the evaporator 7 and the condenser 8, so that the air mass flow is heated by approximately 1K to 5K because of the heat transfer of the waste heat of the blower 29 to the air and is conducted in the heated condition to the evaporator 7 and to the condenser 8. The waste heat of the blower 29 can thus be utilized for heating the air to be supplied into the passenger compartment.

If the air to be supplied into the passenger compartment 9 must be heated in the full heating operation with simultaneous dehumidification, the second flow duct 4 will be closed by means of the air baffle device 19, which is positioned in the second end position, same as baffle device 20, as can be seen in FIG. 2c. The entire air mass flow conveyed through the blower 29 is conducted across the evaporator 7. The air baffle device 18 would close the bypass duct 14.

Since the heat output to be released on condenser 8 with a closed coolant circuit, comprising an evaporator 7, a compressor and a condenser 8, results from the sum of the power supplied to the coolant on evaporator 7 and in the compressor, and the heat output on the condenser 8 is thus merely greater by the power supplied to the compressor than the power supplied to the evaporator 7, the air can only be slightly heated while flowing across the heat transfer surfaces of the condenser 8. If the air mass flow is the same, it is therefore possible to supply merely the compressor power again by straight dehumidification of the air, wherein in this context the losses of the system must also still be considered.

To achieve a greater heating capacity on condenser 8 and in order to heat the air mass flow to be supplied into the passenger compartment 9 more, a first portion of the air mass flow cooled and dehumidified while flowing across the evaporator 7 is discharged into the environment, while the second portion of the air mass flow is conducted across the condenser 8 while being heated and is subsequently conveyed into the passenger compartment 9. The air mass flow is split up by means of controlling the air baffle device 18 arranged in the bypass duct 14.

Since the air mass flow conveyed into the passenger compartment 9 is reduced by the portion discharged into the environment, greater heating of the air mass flow conveyed into the passenger compartment 9 is possible.

Figure 2E:
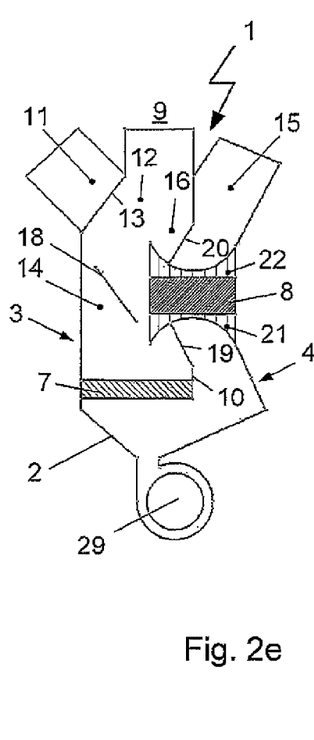
FIG. 2e is a climate control system according to FIG. 2a in mixed operation.

As FIG. 2e illustrates, in addition to operating in the refrigeration system mode and in the pure heating mode, the climate control system 1 can also be operated in a mixed mode. For this purpose, the conditioned air is composed of a portion of cooled and dehumidified air as well as of a portion of cooled, dehumidified and reheated air.

The blower 29 conveys an air mass flow through the first flow duct 3, which flows completely across the evaporator 7 while being cooled and dehumidified, as well as an air mass flow through the second flow duct 4, which is conducted across a partial area of the condenser 8 and which dissipates the heat again that was absorbed in evaporator 7. For this purpose, the air baffle devices 19, 20 are aligned such that a second area of the condenser 8 is arranged in the second flow duct 4 and a first area of the condenser 8 is arranged in the first flow duct 3. The air mass flow which was conducted through the second flow duct 4 is discharged into the environment through the warm air flow path 15, which is enabled by the air baffle device 20.

A first portion of the air mass flow that was conditioned while flowing across the evaporator 7 is conducted to the cold air flow path 12 through the bypass duct 14 by opening the air baffle device 18. This portion of the air mass flow will no longer be conditioned. A second portion of the partial air mass flow conducted across the evaporator 7 is conducted parallel to the partial air mass flow in the flow duct 4 across the first area of the condenser 8 to the warm air flow path 16 while being heated. The partial air mass flow from the cold air flow path 12, which is conducted through the bypass duct 14 and is not further conditioned, i.e. simply cooled and dehumidified, is mixed with the partial air mass flow from the warm air flow path 16, which was additionally conducted across condenser 8 while being heated, and is subsequently supplied into the passenger compartment 9.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS

1 Climate control system
2 Housing
3 First flow duct
4 Second flow duct
5, 6 Blower
7 Heat exchanger, evaporator
8 Heat exchanger, condenser
9 Passenger compartment
10 Partition
11, 12 Cold air flow path
13 Air baffle device/damper of the cold air flow paths 11, 12
14 Bypass duct in first flow path 3
15, 16 Warm air flow path
17 Air baffle device/damper of the warm airflow paths 15, 16
18 Air baffle device/damper for bypass duct 14
19 Air baffle device/damper between first and second flow duct 3, 4 for inflow to the condenser 8
20 Air baffle device/damper between first and second flow duct 3, 4 for outflow from the condenser 8
21, 22 Static air baffle device/air baffle plate
23, 24 Surface of the static air baffle device 21, 22
25, 26 Axis, axis of rotation of the static air baffle device 19, 20
27, 28 Direction of rotation of the static air baffle device 19, 20
29 Blower
L Length

What is claimed is:

1. A heat exchanger assembly for cooling of air, comprising:
   a blower;
   an air duct in fluid communication with the blower;
   a first heat exchanger integrated into a cooling circuit, configured to permit coolant to flow through the heat exchanger, and further configured to permit air from the blower to be applied to the heat exchanger to enable heat from the air to be transferred to and evaporate the coolant; and
   a housing with a first flow duct and a second flow duct for conduction of air;
   wherein the blower is arranged upstream of the first heat exchanger in relation to a direction of airflow wherein waste heat of the blower heats the air before reaching the heat exchanger;
   wherein the first heat exchanger is a double-row tubular heat exchanger with tubes arranged in rows,
   wherein the coolant circuit comprises the first heat exchanger and a second heat exchanger, wherein the first heat exchanger is arranged in the first flow duct and the second heat exchanger is arranged in the second flow duct,
   wherein the first heat exchanger is configured for a refrigeration operation for cooling of a passenger compartment and a heat pump operation for heating of the passenger compartment, wherein the first heat exchanger is an evaporator, and
   wherein the second heat exchanger is a condenser, the second heat exchanger comprises a heat transfer surface comprising a first area disposed partially across a cross-section of the first flow duct and a second area disposed entirely across a cross-section of the second flow duct, wherein the heat transfer surface of the condenser is controllably variably partitioned.

2. The heat exchanger assembly according to claim 1, wherein the first heat exchanger comprises a flow surface in the range of 2 $dm^2$ to 10 $dm^2$.

3. The heat exchanger assembly according to claim 1, wherein the first heat exchanger is configured so the coolant flows through the rows as a single flow.

4. The heat exchanger assembly according to claim 1, wherein the first heat exchanger is configured so that the coolant flows through at least one row in a multi-flow manner.

5. The heat exchanger assembly according to claim 1, wherein the first heat exchanger is configured as one of a cross-parallel heat exchanger and a cross-countercurrent flow heat exchanger.

* * * * *